F. L. PARKER.
DRAG SCOOP OR BUCKET.
APPLICATION FILED JAN. 30, 1909.
1,082,438.
Patented Dec. 23, 1913.
2 SHEETS—SHEET 1.
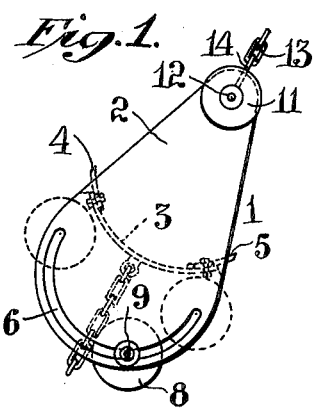
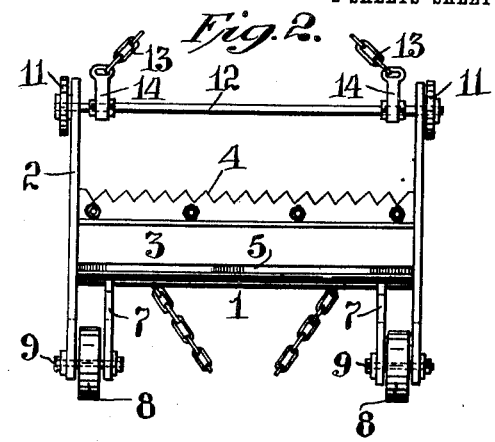
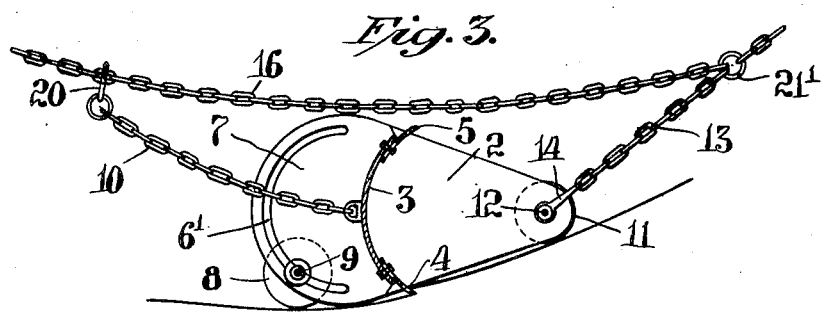
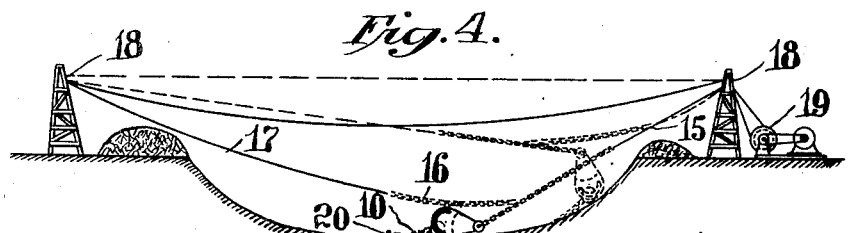
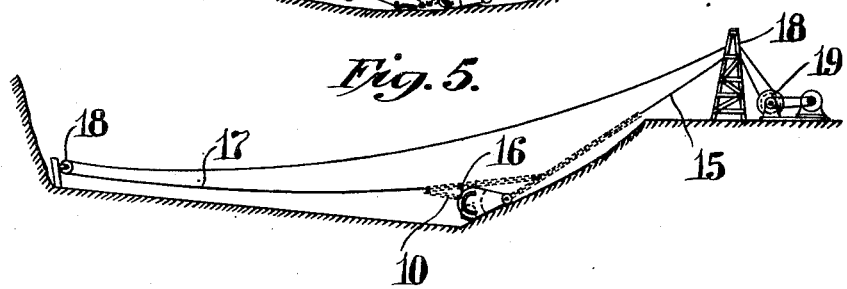
Attest:
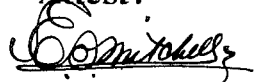
Inventor:
Frank L. Parker
by Donald Campbell
Atty

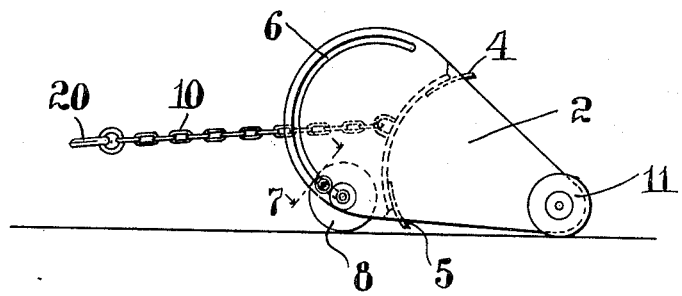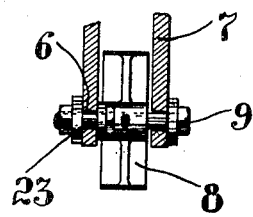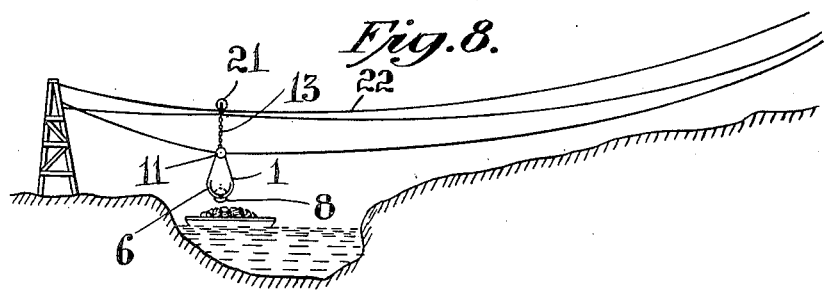

UNITED STATES PATENT OFFICE.

FRANKE L. PARKER, OF NEW YORK, N. Y.

DRAG SCOOP OR BUCKET.

1,082,438.  Specification of Letters Patent.  Patented Dec. 23, 1913.

Application filed January 30, 1909. Serial No. 475,223.

*To all whom it may concern:*

Be it known that I, FRANKE L. PARKER, a subject of the King of Great Britain, and a resident of the city of New York, in the county and State of New York, have invented certain new and useful Improvements in Drag Scoops or Buckets, of which the following is a specification.

My invention relates to improvements in apparatus for excavating dirt, hardpan, gravel, stone or like material, having more particular reference to drag scoops or shovels, and the primary object thereof is the provision of an improvement of this type which can be operated in reverse directions, the scoop being inverted at the beginning of the return movement thereof.

A further object is to so position the scrapers or cutter parts that practically the entire weight of the scoop will come thereupon.

Further the invention aims to provide novel means whereby during the return movement of the scraper, if the same be not inverted, the scraper part or blade may be elevated so that its cutting edge will not be dragged over the ground to its possible injury.

With the above and other objects in view, to be referred to in the following description, the invention consists of the parts, arrangement and combination of parts hereinafter described and succinctly pointed out in the appended claims.

I will first describe one particular form of machine, the same constituting an embodiment of my invention, and will then point out the novel features in the claims.

In the accompanying drawings in which like numerals of reference indicate like parts throughout the several views: Figure 1 is a side view of one embodiment of the present invention, the same being tilted and illustrating the primary position of the scoop during its inversion. Fig. 2 is a front view of the scoop or shovel as illustrated in Fig. 1. Fig. 3 is a longitudinal section of the invention and showing the draft lines or cables in position. Fig. 4 is a diagrammatical view showing my invention in operation and illustrating more clearly the manner in which the same is inverted for scooping action during return movement. Fig. 5 is a diagrammatical view showing the scoop connected so as to have an active run in but one direction. Fig. 6 is a side view showing the improvement with the supporting rollers at the lower limit of the movement, and the means for holding the axles thereof against longitudinal movement. Fig. 7 is a view taken on line 7—7 of Fig. 6, and Fig. 8 is a diagrammatical view showing the scoop serving as an elevated carrier and being in position to dump its load.

Referring to the drawings by reference numerals, 1 indicates the scraper body composed of side plates 2 having rounded rear ends, and a rear wall 3. Secured to the upper and lower portions of this rear wall are the scraper or cutter parts 4 and 5, the same being in the form of blades, one of which is preferably serrated or toothed and the other having a smooth edge; for a purpose made apparent in the following. These cutter parts project beyond the adjacent edges of the side plates 2 and said rear wall is curved in cross section so that its upper and lower portions are directed forwardly to present the cutter parts for more effective work. Also by curving the rear wall, it will be observed that the excavated material in moving thereover will be directed forwardly where it will fall in a heap in front of the scraper until the same is full.

The rear portions of plates 2 are formed with semi-circular slots 6 which are struck from a point midway between the opposite edges of the said plates, and members 7 which are formed integral with their rear wall 3 are also formed with similar slots, as 6', which aline with said slots 6.

Rollers or wheels 8 are mounted on axles 9 which have their opposite portions slidably received in the slots of said plates 2 and members 7, and by the particular disposition of said slots it will be observed, that when said axles are moved to either end portions of the slots, the rear portion of the scoop or shovel will be elevated from the ground to such a height that the blades 4 and 5 will be held out of contact with the earth and any possible injury thereto will thus be avoided. Of course it is only presumed that the scrapers will be elevated during an inactive run of the scoop and by the arrangement of the slots shown, when a pull is exerted upon chain 10, which is connected to the scoop body as shown, said body will be drawn rearward, and wheels 8 meeting with resistance by the earth will be held more or less stationary so that their axles 9 will be seated in the adjacent end portions of slots 6 and 6' by the rearward movement of the body 1, and the lower scraper or cutter part thereby elevated.

Rollers or wheels 11 are provided at the forward end of the body 1, the same being mounted for rotation on an axle 12 which projects through and is loosely mounted in side plates 2. Axle 12 is preferably provided with suitable means to which the flexible connection 13 is attached, such means in the present showing consisting of arms 14. This construction, however, can be obviously varied at will.

Flexible connection 13 forms one end portion of the draft line 15 and another connection 16 is attached to connection 13, the last named connection extending rearwardly of the scoop and being connected to a rehaul line 17. In the present showing the rehaul line 17 and draft line 15 are shown as being in the form of an endless cable which passes over suitable idlers or pulleys 18 and is attached or wound on a suitable drum 19 which can be operated in any desired manner. By connecting both the draft line and the rehaul line to the scoop at the forward portion thereof it will be noted that when the rehaul line is slacked and draft line 15 tensioned that the scoop will be drawn forward as clearly shown in Figs. 3 and 4. When, however, line 15 is slackened and the rehaul line tensioned, the scoop will be inverted, as shown in dotted lines Fig. 4, and its return run will be an active one and the material loosened in the first instance by the serrated or toothed scraper or cutter part and not caught by the scoop, will be scraped in an effective manner by the straight edged scraper part without offering any great resistance thereto. Now assuming that it is not desired that the scoop should be active during its return run, as is the case when it is desired to excavate from the foot of a bank (see Fig. 5), hook 20 which is secured on the free end of connection or chain 10 is hooked to connection 16 and therefore when line 17 is tensioned the rearward pull on the scoop will be transferred from its forward end to its rear portion and consequently the scoop will be returned uninverted, and when the rear portion of body 1 is raised on axles 9 the lower portion of the rear wall will occupy a vertical position and consequently any clinging material will fall therefrom.

My invention can be operated as well under water as on land and will also serve as a bucket conveyer (see Fig. 8), the same after having been filled, having a hook on pulley 21 mounted on trolley line 22, engaged with the ring 21' of its connection 13. The trolley line is slacked to effect this connection and then again drawn taut so as to elevate the scoop. The scoop can then be drawn forward or backward by draft-lines 15 and 17 as in the first instance. Any desired means can be employed to empty the scoop when it has reached its destination, an example of which is shown in Fig. 8.

To move my invention to the place of work a team can be attached to connection 10 (see Fig. 6) and bolts as 23 are secured in slots 6 or 6' to the rear of axles 9 to prevent accidental lowering of the rear portion of the scoop through any longitudinal movement of the axles 9 in said slots.

The invention is simple and compact and as will be observed the cutting or scraping edges will hug the surface when the scoop is drawn over any inequalities as the weight of the scoop will bear first and mostly on the lower or active scraper or cutting edge.

Having thus fully described my invention, what I claim as new and desire to secure by Letters Patent, is:

1. A scoop comprising a body, wheels for holding said body elevated, axles on which said wheels revolve, said axles being received in slots extending from points adjacent the upper and lower portions of the said body.

2. A scoop comprising a body formed with approximately semi-circular slots extending to points adjacent the upper and lower portions of said body, rotatable means for holding said body elevated, and means on which said means revolve, said last means being loosely received in said slots.

3. In a drag scoop the combination of an elongated rigid and generally pear-shaped body, a rearwardly concaved transverse collecting wall fixedly located between the body ends, a projecting cutter at each end of said wall, a draft attachment at the front of the body, rollers at the front end of the body, a rear draft attachment, and shiftable rear rollers fitted to raise the cutters when the scoop is drawn by rear draft.

4. In a drag scoop the combination of an elongated rigid and generally pear-shaped body, a rearwardly concaved transverse collecting wall fixedly located between the body ends, a projecting cutter at each end of said wall, an axial draft attachment at the front of the body, rollers at the front end of the body, and an axial rear draft attachment.

5. In a drag scoop the combination of an elongated rigid body rounded at its rear, a rearwardly concaved transverse collecting wall fixedly located between the body ends, a projecting cutter at each end of said wall, a draft attachment at the front of the body, rollers at the front end of the body, a rear draft attachment, and shiftable rear rollers fitted by means of deviating guide surfaces to raise the cutters when the scoop is drawn by rear draft.

In witness whereof I have hereunto set my hand, this 23rd day of January, 1909.

FRANKE L. PARKER.

Witnesses:
K. E. FERRY,
J. F. MCCABE.